United States Patent
Liu et al.

(10) Patent No.: US 11,764,436 B2
(45) Date of Patent: Sep. 19, 2023

(54) BATTERY MODULE, BATTERY PACK, ELECTRIC APPARATUS, AND METHOD AND DEVICE FOR MANUFACTURING BATTERY MODULE

(71) Applicant: Contemporary Amperex Technology Co., Limited, Ningde (CN)

(72) Inventors: Qian Liu, Ningde (CN); Chengdu Liang, Ningde (CN); Xiaofu Xu, Ningde (CN); Quanguo Li, Ningde (CN); Yonghuang Ye, Ningde (CN); Haizu Jin, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/889,422

(22) Filed: Aug. 17, 2022

(65) Prior Publication Data

US 2022/0393292 A1    Dec. 8, 2022

Related U.S. Application Data

(63) Continuation of application No. PCT/CN2021/084743, filed on Mar. 31, 2021.

(51) Int. Cl.
*H01M 50/267* (2021.01)
*H01M 50/51* (2021.01)
(Continued)

(52) U.S. Cl.
CPC ......... *H01M 50/267* (2021.01); *H01M 4/366* (2013.01); *H01M 4/505* (2013.01);
(Continued)

(58) Field of Classification Search
CPC .... H01M 50/267; H01M 4/366; H01M 4/505; H01M 4/525; H01M 50/204;
(Continued)

(56) References Cited

U.S. PATENT DOCUMENTS

2012/0231341 A1* 9/2012 Kim .................... C01G 53/42
977/773

FOREIGN PATENT DOCUMENTS

| CN | 101242011 B | 9/2012 |
|---|---|---|
| CN | 103311562 A | 9/2013 |

(Continued)

OTHER PUBLICATIONS

Cycle life requirements and test methods for traction battery of electric vehicle. GB/T 31484-2015, 20 pages.
The International Search Report for PCT Application No. PCT/CN2021/084743, dated Jan. 6, 2022, 11 pages.
The extended European search report for European Application No. 21878762.0, dated Apr. 19, 2023, 8 pages.

*Primary Examiner* — Cynthia K Walls
(74) *Attorney, Agent, or Firm* — East IP P.C.

(57) ABSTRACT

The present application relates to a battery module, comprising a first type of battery cells and a second type of battery cells electrically connected at least in series, wherein the first and second type of battery cells are battery cells of different chemical systems, the first type of battery cells comprises N first battery cells, the second type of battery cells comprises M second battery cells, and N and M are positive integers; a positive electrode plate of the second battery cell contains two or more positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, in mV/% SOC, where SOC represents a charge state and OCV represents an open circuit voltage.

15 Claims, 3 Drawing Sheets

(51) Int. Cl.
  *H01M 50/204* (2021.01)
  *H01M 4/36* (2006.01)
  *H01M 4/505* (2010.01)
  *H01M 4/525* (2010.01)
  *H01M 4/02* (2006.01)

(52) U.S. Cl.
  CPC ......... *H01M 4/525* (2013.01); *H01M 50/204* (2021.01); *H01M 50/51* (2021.01); *H01M 2004/028* (2013.01)

(58) Field of Classification Search
  CPC ........... H01M 50/51; H01M 2004/028; H01M 10/42; Y02E 60/10
  See application file for complete search history.

(56) References Cited

FOREIGN PATENT DOCUMENTS

| | | |
|---|---|---|
| CN | 105811028 A | 7/2016 |
| CN | 208674305 U | 3/2019 |
| CN | 110061531 A | 7/2019 |
| CN | 111781504 A | 10/2020 |
| CN | 111916844 A | 11/2020 |
| EP | 4047711 A1 | 8/2022 |
| EP | 4047712 A1 | 8/2022 |

\* cited by examiner

BATTERY MODULE, BATTERY PACK, ELECTRIC APPARATUS, AND METHOD AND DEVICE FOR MANUFACTURING BATTERY MODULE

CROSS-REFERENCE TO RELATED APPLICATIONS

This application is a continuation of International Application No. PCT/CN2021/084743, filed on Mar. 31, 2021, entitled "BATTERY MODULE, BATTERY PACK, ELECTRIC APPARATUS, AND METHOD AND DEVICE FOR MANUFACTURING BATTERY MODULE", which is incorporated herein by reference in its entirety.

TECHNICAL FIELD

This application relates to the technical field of energy storage devices, in particular to a battery module, a battery pack, an electric apparatus, a method for manufacturing a battery module, and a device for manufacturing a battery module.

BACKGROUND

Secondary batteries, as clean and renewable resources, can be used as driving energy sources or storage units in vehicles, energy storage and other fields. With the increasing requirements for environmental protection of energy sources, the secondary batteries has become increasingly popular and widespread. In order to adapt to the needs of different environments and application scenarios, new requirements for the performance of the secondary batteries are derided in the industry.

At the present stage, in order to increase the total available energy of a secondary battery, a plurality of battery cells of the same chemical system are usually connected in series or in parallel to form a battery module (or a battery pack). However, due to the design limitation of the chemical system of the battery cells, it is often difficult to achieve simultaneous improvement on multiple electrical properties of the battery module only by adjusting the internal chemical system of a single battery cell. In the prior art, the battery modules (or battery packs) that use single battery cells of the same chemical system, such as lithium iron phosphate battery cells or lithium nickel cobalt manganese oxide ternary battery cells, are mostly used; these battery modules or battery packs, however, are liable to be overly charged at a state of nearly fully charged during the charging process, and cause safety problems.

Therefore, on the premise of ensuring the good electrical performance of the secondary batteries (especially the battery modules or battery packs), one of the urgent issues in the field of second batteries is how to further prevent the overcharging and enhance the safety performance of the battery module.

SUMMARY

The present application is completed in view of the above problems in the prior art, and its objective is to provide a battery module, which includes a first type of battery cells and a second type of battery cells of different chemical systems, wherein the first type of battery cells and the second type of battery cells are connected at least in series. By matching SOC-OCV curves of the first type of battery cells and that of the second type of battery cells, the second type of battery cells may accurately reflect the charge state of the battery module in a state of nearly fully charged, so as to effectively prevent the overcharge of the battery cells in the battery module and greatly improve the safety of the battery module.

A first aspect of the present application provides a battery module, including a first type of battery cells and a second type of battery cells electrically connected at least in series, wherein the first type of battery cells and the second type of battery cells are battery cells of different chemical systems, the first type of battery cells includes N first battery cells, the second type of battery cells includes M second battery cells, and N and M are positive integers; a positive electrode plate of the second battery cell contains two or more positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, in mV/% SOC, where SOC represents a charge state and OCV represents an open circuit voltage.

In any embodiment of the present application, when the dynamic SOC of the second battery cell is in the range from 90% to 98%, the change rate $\Delta OCV/\Delta SOC$ in the OCV relative to the SOC of the second battery cell satisfies $3.5 \leq \Delta OCV/\Delta SOC \leq 7$, in mV/% SOC.

In any embodiment of the present application, when the dynamic SOC of the second battery cell is in a range from 30% to 80%, the change rate $\Delta OCV/\Delta SOC$ in the OCV relative to the SOC of the second battery cell satisfies $\Delta OCV/\Delta SOC \leq 1$, in mV/% SOC.

In any embodiment of the present application, when the dynamic SOC of the second battery cell is in the range from 30% to 80%, the change rate $\Delta OCV/\Delta SOC$ in the OCV relative to the SOC of the second battery cell satisfies $\Delta OCV/\Delta SOC \leq 0.25$, in mV/% SOC.

In any embodiment of the present application, a discharge battery balance rate CB2 of the second battery cell is $1.00 \leq CB2 \leq 1.16$, and optionally is $1.03 \leq CB2 \leq 1.11$.

In any embodiment of the present application, a positive electrode active material of the second battery cell includes at least a layered lithium transition metal oxide represented by formula (I) and a lithium-containing phosphate represented by formula (II),

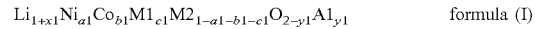
$$Li_{1+x1}Ni_{a1}Co_{b1}M1_{c1}M2_{1-a1-b1-c1}O_{2-y1}A1_{y1} \qquad \text{formula (I)}$$

$$LiFe_{1-x2-y2}Mn_{x2}M'_{y2}PO_4 \qquad \text{formula (II)}$$

in formula (I), $-0.1 \leq x1 \leq 0.2$, $0.3 \leq a1 < 0.97$, $0 < b1 \leq 0.3$, $0 < a1+b1+c1 < 1$, $0 \leq y1 < 0.2$, M1 is at least one selected from Mn and Al, M2 is one or more selected from Fe, Cr, Ti, Zn, V, Al, W, Mg, B, Cu, Y, Si, Sr, Zr and Ce, and A1 is one or more selected from S, N, F, Cl, Br, $PO_4^{3-}$ and I; optionally, $0.5 < a1 \leq 0.7$, and $0.01 \leq b1 \leq 0.15$; and in formula (II), $0 \leq x2 \leq 1$, optionally, $0 \leq x2 \leq 0.5$, $0 \leq y2 \leq 0.1$, and M' is one or more selected from transition metal elements and non-transition metal elements other than Fe and Mn.

In any embodiment of the present application, in the positive electrode active material of the second battery cell, the layered lithium transition metal oxide represented by formula (I) has a mass percentage from 0.5 wt % to 30 wt %, optionally from 1 wt % to 20 wt %, and further optionally from 3 wt % to 15 wt %.

In any embodiment of the present application, the first battery cell satisfies the following conditions 1 and 2, Condition 1: when a dynamic SOC of the battery module is in the range from 90% to 98%, a ratio Q of $\Delta OCV/\Delta SOC$ of the second battery cell to $\Delta OCV/\Delta SOC$ of the first battery cell is $2 \leq Q \leq 40$, and optionally, $4 \leq Q \leq 32$;

Condition 2: when a dynamic SOC of the first battery cell is in the range from 30% to 80%, the change rate $\Delta OCV/\Delta SOC$ in the OCV relative to the SOC of the first battery cell satisfies $\Delta OCV/\Delta SOC \leq 0.25$, in mV/% SOC; and optionally, the change rate $\Delta OCV/\Delta SOC$ is $\leq 0.15$ when the dynamic SOC of the first battery cell is in the range from 30% to 80%.

In any embodiment of the present application, a discharge battery balance rate CB1 of the first battery cell satisfies $1.00 \leq CB1 \leq 1.18$; and optionally, $1.04 \leq CB1 \leq 1.14$.

In any embodiment of the present application, a positive electrode active material of the first battery cell includes a lithium-containing phosphate represented by formula (III),

$$LiFe_{1-x3-y3}Mn_{x3}M''_{y3}PO_4 \quad \text{formula (III)}$$

where $0 \leq x3 \leq 1$, $0 \leq y3 \leq 0.1$, and M'' is one or more selected from transition metal elements and non-transition metal elements other than Fe and Mn.

In some embodiments of the present application, the positive electrode active material of the first battery cell includes one or more of $LiFePO_4$, $LiMnPO_4$, $LiMn_{1-x3}Fe_{x3}PO_4$, and $LiV_{1-x3}Fe_{x3}PO_4$, where x3 independently satisfies $0<x3<1$.

In some other embodiments of the present application, the positive electrode active material for the first battery cell includes at least a layered lithium transition metal oxide represented by formula (IIII),

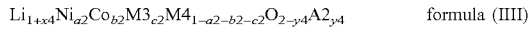

$$Li_{1+x4}Ni_{a2}Co_{b2}M3_{c2}M4_{1-a2-b2-c2}O_{2-y4}A2_{y4} \quad \text{formula (IIII)}$$

in formula (IIII), $-0.1 \leq x4 \leq 0.2$, $0.3 \leq a2 < 0.95$, $0 < b2 < 0.3$, $0 < a2+b2+c2 \leq 1$, $0 \leq y4 < 0.2$, M3 is at least one selected from Mn and Al, M4 is one or more selected from Fe, Cr, Ti, Zn, V, Al, Zr and Ce, and A2 is one or more selected from S, F, Cl and I.

A second aspect of the present application provides a battery pack, including the battery module according to the first aspect.

A third aspect of the present application provides an electric apparatus, including the battery module according to the first aspect or the battery pack according to the second aspect, wherein the battery module or the battery pack is used as a power source or an energy storage unit of the electric apparatus.

A fourth aspect of the present application provides a method for manufacturing a battery module, including the following steps: obtaining a first type of battery cells and a second type of battery cells, wherein the first type of battery cells and the second type of battery cells are battery cells of different chemical systems, the first type of battery cells includes N first battery cells, the second type of battery cells includes M second battery cells, N and M are positive integers, a positive electrode plate of the second battery cell contains two or more positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, where SOC represents a charge state and OCV represents an open circuit voltage; and connecting the first type of battery cells and the second type of battery cells at least in series to form the battery module according to the first aspect.

A fifth aspect of the present application provides a device for manufacturing a battery module, including: a clamping arm unit, which is used to obtain a first type of battery cells and a second type of battery cells, the first type of battery cells and the second type of battery cells are battery cells of different chemical systems, the first type of battery cells includes N first battery cells, the second type of battery cells includes M second battery cells, N and M are positive integers, a positive electrode plate of the second battery cell contains two or more positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, where SOC represents a charge state and OCV represents an open circuit voltage; an assembling unit, which is used to connect the first type of battery cells and the second type of battery cells at least in series to form the battery module according to the first aspect; and a control unit, which is used to control the clamping arm unit and the assembling unit.

Technical Effect

The present application provides a battery module, which includes a first type of battery cells and a second type of battery cells of different chemical systems, wherein the first type of battery cells and the second type of battery cells are electrically connected in series at least, and SOC-OCV curves of the first type of battery cells and that of the second type of battery cells are matched. As a result, when the battery module is at the state of nearly fully charged, the second type of battery cells may accurately reflect the charge state of the battery module, so as to effectively prevent the overcharge of the battery module and greatly improve the safety of the battery module.

Figure 1:
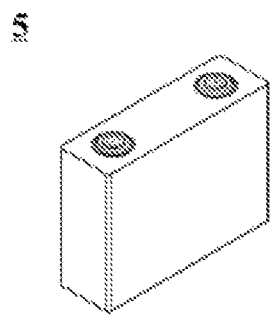
FIG. 1 is a schematic diagram showing an example of a battery cell of the present application.

In the figures, reference numerals are described as follows:

5, 5a, 5b battery cell
51 shell
52 electrode assembly
53 cover plate
4 battery module
1 battery pack
2 upper box body
3 lower box body

DETAILED DESCRIPTION

The "range" disclosed herein is defined by a lower limit and an upper limit. A given range is defined by selecting a lower limit and an upper limit, and the selected lower limit and upper limit define the boundaries of a particular range. The range defined in this way can include or exclude end values, and can be combined arbitrarily, that is, any lower limit can be combined with any upper limit to form a range. For example, if a range of 60-120 and 80-110 is listed for a specific parameter, it is understood that a range of 60-110 and 80-120 is are also expected. In addition, if minimum values of a range 1 and 2 are listed and maximum values of a range 3, 4 and 5 are listed, the following ranges can all be expected: 1-3, 1-4, 1-5, 2-3, 2-4 and 2-5. In the present application, unless otherwise specified, the numerical range "a-b" represents an abbreviation of any combination of real numbers between a and b, where both a and b are real numbers. For example, the numerical range "0-5" represents all real numbers "0-5" listed herein, and "0-5" is only an abbreviation of a combination of these values. In addition, when a parameter is expressed as an integer ≥2, it is equivalent to disclosing that the parameter is, for example, an integer 2, 3, 4, 5, 6, 7, 8, 9, 10, 11, 12, etc.

In the present application, unless otherwise specified, all the embodiments and preferred embodiments mentioned herein can be combined with each other to form new technical solutions.

In the present application, unless otherwise specified, all the technical features and preferred features mentioned herein can be combined with each other to form new technical solutions.

In the present application, unless otherwise specified, all the steps mentioned herein can be carried out sequentially or randomly, but preferably carried out sequentially. For example, the method includes steps (a) and (b), which represents that the method may include steps (a) and (b) performed sequentially, or may include steps (b) and (a) performed sequentially. For example, the method may further include step (c), which represents that step (c) may be added to the method in any order, for example, the method may include steps (a), (b) and (c), or steps (a), (c) and (b), or steps (c), (a) and (b).

In the present application, unless otherwise specified, the expressions "comprise" and "include" mentioned herein are open-ended or closed-ended. For example, the expression "comprise" and "include" may comprise or include other components that are not listed, or comprise or include only the listed components.

In the description herein, it should be noted that, unless otherwise specified, a numeric range described with the term "above" or "below" includes the lower or upper limit itself, and "more" in "one or more" means two or more.

In the description herein, unless otherwise specified, the term "or" is inclusive. For example, the phrase "A or B" means "A, B, or both A and B". More specifically, any of the following conditions satisfies the condition "A or B": A is true (or exists) and B is false (or does not exist); A is false (or does not exist) and B is true (or exists); or both A and B are true (or exist).

[Battery Cell]

In the present application, the "battery cell" refers to a battery unit that can be independently charged and discharged. The battery cell includes a positive electrode plate, a negative electrode plate, a separator, an electrolyte solution, and an outer package for packaging the positive electrode plate, the negative electrode plate, the separator and the electrolyte solution. The type and shape of the battery cell are not particularly limited in the present application, and the battery cell may be various types of battery cells, such as a soft-packed battery cell, a cylindrical battery cell, or a square battery cell. The battery cell in the present application may be a lithium ion battery cell, a potassium ion battery cell, a sodium ion battery cell, a lithium sulfur battery cell, etc., and the lithium ion battery cell is particularly preferred. During charge and discharge of the battery unit, active ions are repeatedly intercalated and deintercalated between the positive electrode plate and the negative electrode plate. The electrolyte conducts the ions between the positive electrode plate and the negative electrode plate.

In the present application, the "battery cell" refers to a battery unit that can be independently charged and discharged. The components of the battery cell may include a positive electrode plate, a negative electrode plate, a separator, an electrolyte solution, and an outer package for packaging the positive electrode plate, the negative electrode plate, the separator and the electrolyte solution. The type and shape of the battery cell are not particularly limited in the present application, and the battery cell may be various types of battery cells, such as a soft-packed battery cell, a cylindrical battery cell, or a square battery cell. The battery cell in the present application may be a lithium ion battery cell, a potassium ion battery cell, a sodium ion battery cell, a lithium sulfur battery cell, etc., and the lithium ion battery cell is particularly preferred. During charge and discharge of the battery, active ions are repeatedly intercalated and deintercalated between the positive electrode plate and the negative electrode plate. The electrolyte conducts ions between the positive electrode plate and the negative electrode plate.

In the present application, the "chemical system" of the battery cell is classified according to the components of a positive electrode active material used in the positive electrode plate of the battery cell, and the elements or substances that are doped in or is used to coat the positive electrode active material are not limited. For example, the battery cell which positive electrode active material is lithium iron phosphate (including those doped with Mn or V elements) may be defined as a battery cell of a lithium iron phosphate chemical system. The battery cell which positive electrode active material is lithium nickel cobalt manganate (generally referred to as NCM) may be defined as a battery cell a NCM chemical system. Further, the chemical system of the battery cell may be further limited based on the relative content of nickel, cobalt, and manganese in the positive electrode active material. For example, the battery cell which positive electrode active material is $LiNi_{0.5}Co_{0.2}Mn_{0.3}O_2$ (generally referred to as NCM523) may be defined as a battery cell of a NCM523 chemical system, the battery cell which positive electrode active material is $LiNi_{0.6}Co_{0.2}Mn_{0.2}O_2$ (generally referred to as NCM622) may be defined as a battery cell of a NCM622 chemical system, and the battery cell which positive electrode active material is $LiNi_{0.8}Co_{0.1}Mn_{0.1}O_2$ (generally referred to as NCM811) may be defined as a battery cell of a NCM811 chemical system. The battery cell using nickel cobalt lithium aluminate system (generally referred to as NCA) as a positive electrode material may be defined as a battery cell of a NCA chemical system. In addition, in the present application, a battery cell of a hybrid system may also be used, for example, a battery cell of a hybrid system including NCM and NCA.

Hereinafter, the basic structures of the negative electrode plate, the positive electrode plate, the electrolyte, and the separator of the battery cell in the present application will be described.

<Positive Electrode Plate>

In the battery cell of the present application, the positive electrode plate includes a positive electrode current collector and a positive electrode film disposed on at least one surface of the positive electrode current collector and including a positive electrode active material. For example, the positive electrode current collector has two opposite surfaces in its thickness direction, and the positive electrode film is disposed on either or both of the two opposite surfaces of the positive electrode current collector. In the battery cell of the present application, the positive electrode current collector may be a metal foil or a composite current collector. For example, the metal foil may be an aluminum foil, and the composite current collector may include a polymer material base layer and a metal layer formed on at least one surface of the polymer material base layer. The composite current collector may be formed by forming a metal material (aluminum, aluminum alloy, nickel, nickel alloy, titanium, titanium alloy, silver and silver alloy) on a polymer material substrate (such as substrates of polypropylene (PP), polyethylene terephthalate (PET), polybutylene terephthalate (PBT), polystyrene (PS), polyethylene (PE) and copolymers thereof).

In the battery cell of the present application, the positive electrode active material may be a positive electrode active material for a battery cell known in the art. For example, the positive electrode active material may include one or more of the following: an olivine structured lithium-containing phosphate, a lithium transition metal oxide, and the modified compounds thereof. However, the present application is not limited to these materials, and other traditional materials that can be used as positive electrode active materials for battery cells can also be used. These positive electrode active materials may be used alone, or two or more of them may be used together. Examples of the lithium transition metal oxide may include, but are not limited to, one or more of a lithium cobalt oxide (such as $LiCoO_2$), a lithium nickel oxide (such as $LiNiO_2$), a lithium manganese oxide (such as $LiMnO_2$ and $LiMn2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (NCM333), $LiNi_{0.5}Co_{0.2}Mn_{0.3}O_2$ (NCM523), $LiNi_{0.5}Co_{0.25}Mn_{0.25}O_2$ (NCM211), $LiNi_{0.6}Co_{0.2}Mn_{0.2}O_2$ (NCM622), and $LiNi_{0.8}Co_{0.1}Mn_{0.1}O_2$ (NCM811)), a lithium nickel cobalt aluminum oxide (such as $LiNi_{0.85}Co_{0.5}Al_{0.05}O_2$), and the modified compounds thereof. Examples of the olivine structured lithium-containing phosphate may include, but are not limited to, one or more of a lithium iron phosphate (such as $LiFePO_4$ (LFP)), a composite material of lithium iron phosphate and carbon, a lithium manganese phosphate (such as $LiMnPO_4$), a composite material of lithium manganese phosphate and carbon, a lithium iron manganese phosphate, and a composite material of lithium iron manganese phosphate and carbon.

In some embodiments, the positive electrode film may further optionally include a binder. Non-limiting examples of the binder that can be used in the positive electrode film may include one or more of the following: polyvinylidene fluoride (PVDF), polytetrafluoroethylene (PTFE), vinylidene fluoride-tetrafluoroethylene-propylene copolymer, vinylidene fluoride-hexafluoropropylene-tetrafluoroethylene terpolymer, tetrafluoroethylene-hexafluoropropylene copolymer and fluorinated acrylate resin.

In some embodiments, the positive electrode film may further optionally include a conductive agent. Examples of the conductive agent used in the positive electrode film may include one or more of superconducting carbon, acetylene black, carbon black, Ketjen black, carbon dots, carbon nanotubes, graphene, and carbon nanofibers.

In one embodiment of the present application, a positive electrode can be prepared by the following way: the above-mentioned components for preparing the positive electrode, such as the positive electrode active material, the conductive agent, the binder, and any other components, are dissolved in a solvent (such as N-methylpyrrolidone) to form a uniform positive electrode slurry; and the positive electrode slurry is coated on the positive electrode current collector, after steps of drying, cold pressing, etc, a positive electrode plate may be obtained.

<Negative Electrode Plate>

The battery cell of the present application includes a negative electrode plate, wherein the negative electrode plate includes a negative electrode current collector and a negative electrode film disposed on at least one surface of the negative electrode current collector, and the negative electrode film includes a negative electrode active material.

In one embodiment of the present application, the negative electrode active material in the negative electrode film may be a negative electrode active material commonly used in the art, such as one or more of natural graphite, artificial graphite, soft carbon, hard carbon, a silicon-based material, a tin-based material, and lithium titanate. The silicon-based material may be one or more selected from elemental silicon, a silicon oxide, and a silicon-carbon composite. The tin-based material may be one or more selected from elemental tin, a tin oxide, and a tin alloy.

In the battery cell of the present application, in addition to the negative electrode active material, the negative electrode film may further include an optional binder, an optional conductive agent, and optional other additives. The negative electrode film of the present application is usually formed by coating and drying a negative electrode slurry. The negative electrode slurry is usually formed by dispersing the negative electrode active material and the optional conductive agent and binder in a solvent and stirring the same uniformly. The solvent may be N-methylpyrrolidone (NMP) or deionized water.

As an example, the conductive agent may include one or more of superconducting carbon, carbon black (such as acetylene black, or Ketjen black), carbon dots, carbon nanotubes, graphene and carbon nanofibers.

As an example, the binder may include one or more of styrene butadiene rubber (SBR), water-soluble unsaturated resin SR-1B, polyacrylic acid (PAA), polyacrylic acid sodium (PAAS), polyacrylamide (PAM), polyvinyl alcohol (PVA), sodium alginate (SA) and carboxymethyl chitosan (CMCS). As an example, the binder may include one or more of styrene-butadiene rubber (SBR), polyvinyl alcohol (PVA), sodium alginate (SA), polymethacrylic acid (PMAA) and carboxymethyl chitosan (CMCS). The optional other additives are, for example, a thickener (such as sodium carboxymethyl cellulose CMC-Na), a PTC thermistor material, etc.

In addition, in the battery cell of the present application, the negative electrode plate does not exclude other additional functional layers other than the negative electrode film. For example, in some embodiments, the negative electrode plate of the present application may further include a conductive undercoating (for example, comprising a conductive agent and a binder) sandwiched between the negative electrode current collector and a first negative electrode film and disposed on the surface of the negative electrode current collector. In some other embodiments, the negative electrode plate of the present application may further include a covering protective layer covering the surface of a second negative electrode film.

In the battery cell of the present application, the negative electrode current collector may be a metal foil or a composite current collector. For example, the metal foil may be a copper foil, a silver foil, an iron foil, or a foil composed of an alloy of the foregoing metals. The composite current collector may include a polymer material base layer and a metal layer formed on at least one surface of the polymer material base layer, and may be formed by forming the metal material (copper, copper alloy, nickel, nickel alloy, titanium, titanium alloy, silver and silver alloy, etc.) on the polymer material base layer (such as a base layer prepared from polypropylene (PP), polyethylene terephthalate (PET), polybutylene terephthalate (PBT), polystyrene (PS), polyethylene (PE) and copolymers thereof).

<Electrolyte Solution>

The electrolyte solution conducts ions between the positive electrode plate and the negative electrode plate. The electrolyte solution includes an electrolyte salt and a solvent. In some embodiments, the electrolyte salt may be one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluorooxalate (LiDFOB), lithium bisoxalate (LiBOB), lithium difluorophosphate ($LiPO_2F_2$), lithium difluorobisoxalate phosphate (LiDFOP) and lithium tetrafluorooxalate phosphate (LiTFOP).

In one embodiment of the present application, the solvent may be one or more selected from the following: ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and ethylsulfonylethane (ESE).

In one embodiment of the present application, based on a total weight of the electrolyte solution, the content of the solvent is 60-99 wt %, such as 65-95 wt %, or 70-90 wt %, or 75-89 wt %, or 80-85 wt %. In one embodiment of the present application, based on a total weight of the electrolyte solution, the content of the electrolyte is 1-40 wt %, such as 5-35 wt %, or 10-30 wt %, or 11-25 wt %, or 15-20 wt %.

In one embodiment of the present application, the electrolyte solution may further optionally include an additive. For example, the additive may include one or more of the following: a negative electrode film-forming additive, a positive electrode film-forming additive, and an additive that can improve certain performance of the battery, such as an additive that improves the overcharge performance of the battery, an additive that improves the high-temperature performance of the battery, and an additive that improves the low-temperature performance of the battery.

<Separator>

In one embodiment of the present application, the battery cell further includes a separator, wherein the separator separates the positive electrode plate from the negative electrode plate of the battery cell and provides selective permeation or blocking of materials of different types, sizes, and charges in the system, for example, the separator can insulate electrons, physically isolate the positive and negative electrode active materials of the battery cell to prevent internal short circuits and formation of an electric field in a certain direction, and enable the ions in the battery to pass through the separator and move between the positive and negative electrodes.

In one embodiment of the present application, the material used to prepare the separator may include one or more of glass fibers, a non-woven fabric, polyethylene, polypropylene and polyvinylidene fluoride. The separator may be a single-layer film or a multi-layer composite film. When the separator is a multi-layer composite film, the materials of each layer may be the same or different.

In one embodiment of the present application, the above-mentioned positive electrode plate, negative electrode plate and separator can be made into an electrode assembly/bare cell through a winding process or a lamination process.

In one embodiment of the present application, the battery cell further includes an outer package, wherein the outer package can be used to package the above-mentioned electrode assembly and electrolyte solution. In some embodiments, the outer package of the battery cell may be a hard case, such as a hard plastic case, an aluminum case, or a steel case. In other embodiments, the outer package of the battery cell may be a soft bag, such as a pocket type soft bag. The material of the soft bag may be plastic, such as one or more of polypropylene (PP), polybutylene terephthalate (PBT), and polybutylene succinate (PBS).

Figure 2:
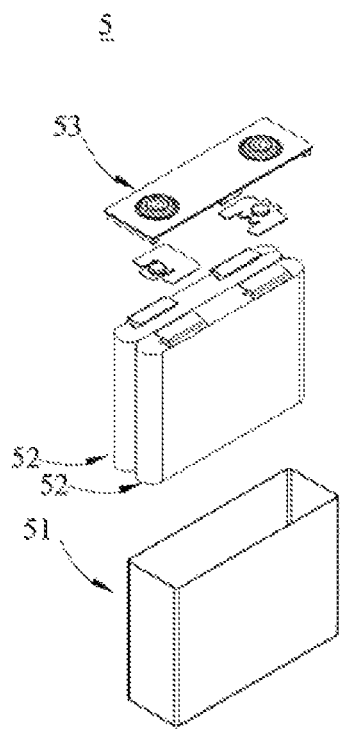
FIG. 2 is an exploded view showing an example of the battery cell of the present application shown in FIG. 1.

FIG. 1 is a schematic diagram showing an example of a battery cell 5 of the present application. FIG. 2 is an exploded view showing an example of the battery cell 5 of the present application shown in FIG. 1.

The outer package may include a shell 51 and a cover plate 53, wherein the shell 51 may include a bottom plate and side plates connected to the bottom plate, and the bottom plate and the side plates enclose to form a receiving cavity. The shell 51 has an opening communicated with the receiving cavity, and the cover plate 53 can cover the opening to close the receiving cavity. The positive electrode plate, the negative electrode plate and the separator can form an electrode assembly 52 through a winding process or a lamination process, wherein the electrode assembly is packaged in the receiving cavity, and the electrolyte solution infiltrates the electrode assembly 52. The number of electrode assemblies 52 included in the battery cell 5 may be one or more.

[Battery Module]

In the present application, the "battery module" is formed by electrically connecting a certain number of battery cells together and putting them into a frame in order to protect the battery cells from external impact, heat, vibration, etc. The shape of the battery cell of the present application may be cylindrical, square, or in other arbitrary shapes.

In the present application, a number of battery cells may be assembled together to form a battery module, the battery module includes two or more battery cells, and the specific number depends on the application of the battery module and the parameters of a single battery module.

Figure 3:
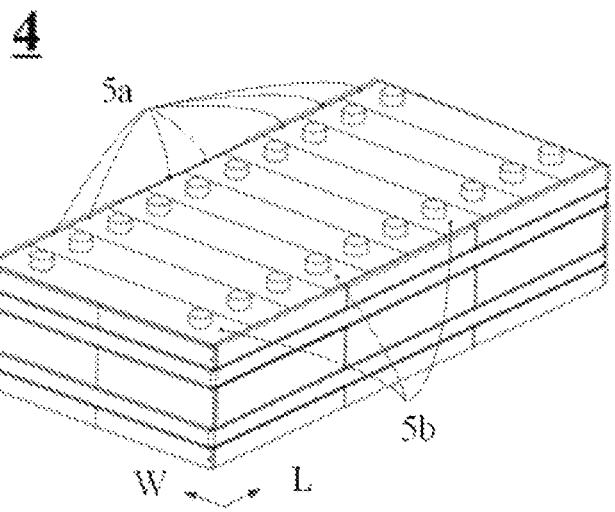
FIG. 3 is a schematic diagram showing an example of a battery module of the present application.

FIG. 3 is a schematic diagram showing an example of a battery module of the present application. Referring to FIG. 3, in the battery module 4, a plurality of battery cells 5a and 5b may be arranged sequentially in the length direction of the battery module 4 (wherein 5a may be first battery cells, and 5b may be second battery cells). Of course, the battery cells may also be arranged in any other way. Further, the plurality of battery cells 5a and 5b can be fixed by fasteners. Optionally, the battery module 4 may further include a housing having a receiving space, and the plurality of battery cells 5a and 5b are received in the receiving space.

<Design of First Battery Cells and Second Battery Cells>

In the present application, the battery module includes a first type of battery cells and a second type of battery cells connected at least in series, wherein the first type of battery cells and the second type of battery cells are battery cells of different chemical system, the first type of battery cells includes N first battery cells, the second type of battery cells includes M second battery cells, N and M are positive integers, the positive electrode plate of the second battery cell contains two or more positive electrode active materials, and when a SOC of the second battery cell during charging is in a range from 90% to 98%, a change rate ΔOCV/ΔSOC in an OCV relative to the SOC of the second battery cell satisfies 3≤ΔOCV/ΔSOC≤9, in mV/% SOC, where SOC represents a charge state and OCV represents an open circuit voltage.

In the field of batteries, the capacity of a battery is generally reflected by the charge state (SOC) of the battery as tested.

Generally, a battery module uniformly output electrical energy to the outside through a plurality of battery cells of the same chemical system are connected in series/parallel. The same chemical system of the multiple battery cells in the battery module has the advantages of helping to improve the consistency of charging and discharging of the multiple battery cells, avoiding the cask effect, and helping to improve the overall electrical performance and service life of the battery module. Common positive electrode active materials include olivine-structure materials such as lithium iron phosphate, and ternary layered materials such as lithium nickel cobalt manganese oxide. When the positive electrode active material of the battery cell in the battery module is a material with a long charging platform, such as lithium iron phosphate, at the state that the battery cell is nearly fully charged (that is, in the range of 90% to 100% SOC), the OCV increases sharply with the increasing of SOC of the battery cell, as a result the SOC, when the battery cell is nearly fully charged, cannot be accurately determined by the OCV, an overcharging of the battery module occurs easily. Meanwhile, in order to increase the energy density of the battery module, the amount of the negative electrode active material is usually reduced as much as possible. As a result, when the battery cell is nearly fully charged, the active sites of the negative electrode plate for the intercalation of lithium ions drastically reduce, an overcharging causes easily. Therefore, on the premise of ensuring good electrical performance of the battery module, the technical problem to be urgently solved currently is how to further solve the overcharging problem of the battery module and to improve the safety of the battery module.

Based on the above technical problem, the present application provides a battery module, which includes a first type of battery cells and a second type of battery cells of different chemical systems, wherein the first type of battery cells and the second type of battery cells are connected at least in series, and a positive electrode active material in the second type of battery cells is a composite material, so that an OCV change rate of the second type of battery cells at a high SOC state is in a range from 3 to 9 mV/% SOC. Since the first type of battery cells and the second type of battery cells in the battery module are connected at least in series, the charging and discharging trends of the two types of battery cells are identical. As the charge state changes, the characteristic of second type of battery cells can be identified easily and accurately by means of the change of the open circuit voltage at the high SOC state. Therefore, the change of the charge state of the second type of battery cells may be used to characterize the change of the overall charge state of the battery module. The battery module formed as above may, on the premise of ensuring stable output of basic electrical performance of, effectively solve the problem of the overcharging of the battery module, and improve the safety of the battery module.

In the present application, the method of obtaining a dynamic OCV change curve of the battery cell in any range from 0% to 100% SOC generally includes the following steps:

1) standing the battery cell for 120 minutes at room temperature of 25° C.;
2) discharging the battery cell at a constant current of 0.33 C to a discharge termination voltage (wherein C is a nominal or rated capacity in the technical specification of the product), and standing for 30 minutes;
3) charging the battery cell of the above step 2 at the constant current of 0.33 C to a charge termination voltage, at a constant voltage to the current of ≤0.05 C, and standing for 30 minutes;
4) discharging the battery cell of the above step 3 at a constant current of 0.33 C to the discharge termination voltage, wherein the discharged capacity is recorded as $C_0$, and standing for 30 minutes;
5) charging the battery cell of the above step 4 above at a constant current of 0.33 $C_0$ to the charge termination voltage, and at a constant voltage to the current of ≤0.05 $C_0$, and standing for 30 minutes;
6) discharging the battery cell of the above step 5 at a constant current of ≤0.05 $C_0$ to the discharge termination voltage (a sampling frequency of 1 s is required), and standing for 30 minutes; and
7) charging the battery cell of the above step 6 at a constant current of 0.05 $C_0$ to the charge termination voltage (a sampling frequency of 1 s is required), and standing for 30 minutes, to obtain a dynamic OCV change curve of the battery cell in a range from 0% to 100% SOC.

In the above steps, discharging at a rate of 0.33 C refers to a discharge rate parameter when the battery cell having 1 C capacity is fully charged or fully discharged for 3 h; when the discharge rate of 0.33 $C_0$ is used for discharging for 9.09 min, the discharged capacity is equal to 9.09 min/180 min=0.05, which is 5% of the total capacity $C_0$. In the present application, the test rates in steps 1) to 5) of the dynamic battery SOC test method may also be any value from 0.01 C to 0.5 C. In addition, the nominal current can be freely selected according to the capacity of the battery module. For example, when the capacity of the battery module is 50 Ah, the nominal current may be 50 A. For another example, when the capacity of the battery module is 100 Ah, the nominal current may be 100 A. The charge termination voltage and the discharge termination voltage can be determined by referring to the provisions in the technical specification of the product or the GBT certification documents for battery cells/battery modules.

According to the dynamic OCV change curve of the battery cell in the range from 0% to 100% SOC, the OCV change difference corresponding to any SOC range can be obtained, and the OCV change rate (ΔOCV/ΔSOC) of the battery cell in certain SOC range can obtained by division.

In some embodiments of the present application, when the dynamic SOC of the second battery cell is in the range from 90% to 98%, the change rate ΔOCV/ΔSOC in the OCV relative to the SOC of the second battery cell satisfies 3.5≤ΔOCV/ΔSOC≤7, in mV/% SOC. That is, at high SOC range, for every 1% increase or decrease in the charge state of the second battery cell, the open circuit voltage of the second battery cell will increase or decrease by at least 3.5-7 mV, which value can satisfy the identification accuracy of a BMS, so as to obtain the accurate change in the charge state when the entire battery module is immediately fully charged.

In some embodiments of the present application, when the dynamic SOC of the second battery cell is in a range from 30% to 80%, the change rate ΔOCV/ΔSOC in the OCV relative to the SOC of the second battery cell satisfies ΔOCV/ΔSOC≤1, in mV/% SOC.

Optionally, when the dynamic SOC of the second battery cell is in the range from 30% to 80%, the change rate ΔOCV/ΔSOC in the OCV relative to the SOC of the second battery cell satisfies ΔOCV/ΔSOC≤0.25, in mV/% SOC. In the present application, during the charging process, the second battery cell has relatively low the OCV change rate when SOC is in the range from 30% to 80%, so that the second battery cell can maintain a relatively long and stable charging voltage platform during the charging and discharging process. This ensures small structure and chemical changes of the positive electrode active material during repeated charging and discharging and less decay of the charging and discharging capacity with long-term use. As a result, it is beneficial to prolong the cycle life of the entire battery module.

In some embodiments of the present application, the discharge battery balance rate CB2 of the second battery cell satisfies 1.00≤CB2≤1.16. Optionally, 1.03≤CB2≤1.10. In the present application, when the discharge battery balance rate of the second battery cell is within the above range, the utilization of the positive and negative electrode active materials in the second battery cell can be further improved, the volumetric energy density of single second battery cell is improved, and relatively low risk of lithium evolution in the second battery cell is ensured simultaneously.

In the present application, the discharge battery balance rate of a battery cell has a well-known meaning in the art, and can be tested by conventional methods. As an example, the following test method can be used: testing the discharge capacity of the negative electrode plate per unit area and the discharge capacity of the positive electrode plate per unit area in the battery cell respectively; and calculating the discharge battery balance rate of the battery cell according to formula as follows: the discharge battery balance rate of the battery cell=the discharge capacity of the negative electrode plate per unit area/the charge capacity of the positive electrode plate per unit area.

The discharge capacity of the positive electrode plate or the negative electrode plate has a well-known meaning in the art, and can be tested by conventional methods. As an example, the discharge capacity can be tested by the following steps:

(1) Sampling electrode plate according to requirements as follows: Disassembling the battery cell after fully discharged, appropriately washing the positive electrode plate and the negative electrode plate with a dimethyl carbonate (DMC) solution, and drying for later use. The positive electrode plate is sampled at any position at the middle part that is greater than 15 mm away from the edge. The negative electrode plate is sampled at the position opposite to the selected positive electrode plate. The sample area of the positive electrode plate is the same as that of the negative electrode plate;

(2) Assembling a button half cell by combining the above cut positive electrode plate and negative electrode plate with a lithium plate as counter electrodes respectively;

(3) Testing the discharge capacity of the negative electrode plate per unit area: Testing the discharge capacity of the button half cell for no less than 10 parallel samples at the test voltage from 0.05 V to 2.0 V, the test temperature of 25° C., and the charge/discharge rate of 0.1 C, to obtain the discharge capacity of the negative electrode plate for this area by averaging the tested values after removing the minimum and maximum ones; and dividing the discharge capacity of the negative electrode plate as obtained in the above test by the area of the negative electrode plate to obtain the discharge capacity of the negative electrode plate per unit area; and (4) Testing the discharge capacity of the positive electrode plate per unit area: Testing the discharge capacity of the button half cell for no less than 10 parallel samples at the working voltage of specified in the GBT certification document, the test temperature of 25° C., and the charge/discharge rate of 0.1 C, to obtain the discharge capacity of the positive electrode plate for this area by averaging the tested values after removing the minimum and maximum ones; and dividing the discharge capacity of the positive electrode plate as obtained in the above test by the area of the positive electrode plate to obtain the discharge capacity of the positive electrode plate per unit area.

In some embodiments of the present application, the positive electrode active material of the second battery cell includes at least a layered lithium transition metal oxide represented by formula (I) and a lithium-containing phosphate represented by formula (II), formula (I)

$$Li_{1+x1}Ni_{a1}Co_{b1}M_{1-a1-b1}O_{2-y1}A_{y1} \qquad \text{formula (I)}$$

$$LiFe_{1-x2-y2}Mn_{x2}M'_{y2}PO_4 \qquad \text{formula (II)}$$

in formula (I), −0.1≤x1≤0.2, 0.3≤a1<0.95, 0<b1<0.2, 0<a1+b1<1, 0≤y1<0.2, M is one or more selected from Mn, Fe, Cr, Ti, Zn, V, Al, Zr and Ce, and A is one or more selected from S, F, Cl and I; and in formula (II), 0≤x2≤1, 0≤y2≤0.1, and M' is one or more selected from transition metal elements and non-transition metal elements other than Fe and Mn.

In the present application, when the positive electrode active material of the second battery cell includes the above two active materials, the change rate ΔOCV/ΔSOC in the OCV relative to the SOC satisfies ΔOCV/ΔSOC≤1 when the SOC of the second battery cell during the charging process is in the range from 30% to 80%, and the change rate ΔOCV/ΔSOC in the OCV relative to the SOC satisfies 3≤ΔOCV/ΔSOC≤9 when the SOC is in the range from 90% to 98%. In the present application, when the positive electrode plate of the second battery cell includes two or more positive electrode active materials, the change rate in OCV and SOC of the second battery cell is still within an appropriate range at the state that the second battery cell is immediately fully charged, it is beneficial for the BMS to accurately obtain the charge state of the battery cells in series in the battery module, so as to realize good capability of preventing overcharge of the battery module.

Meanwhile, the positive electrode active material in the second type of battery cells is a mixture of compounds of formula (I) and formula (II). The initial coulombic efficiency of the compound of formula (I) is lower than that of the compound of formula (II), and the charge and discharge platform of the compound of formula (II) is longer, so active ions deintercalated from the compound of formula (I) with lower first coulombic efficiency can be stored in the negative electrode plate, and can continue to participate in the electrochemical reaction in the later stage of use of the battery cell, so as to supplement the capacity loss caused by the consumption of active ions and further prolong the cycle life of the battery module.

In some embodiments of the present application, in the positive electrode active material of the second battery cell, the layered lithium transition metal oxide represented by formula (I) has a mass percentage from 0.5 wt % to 25 wt %, optionally from 1 wt % to 20 wt %, and further optionally from 3 wt % to 15 wt %.

In some embodiments of the present application, the first battery cell satisfies condition 1 and condition 2,
Condition 1: when a dynamic SOC of the battery module is in the range from 90% to 98%, the ratio of $\Delta OCV/\Delta SOC$ of the second battery cell to $\Delta OCV/\Delta SOC$ of the first battery cell, denoted as Q, satisfies $2 \leq Q \leq 40$, and optionally, $4 \leq Q \leq 32$; and
Condition 2: when a dynamic SOC of the first battery cell is in the range from 30% to 80%, the change rate $\Delta OCV/\Delta SOC$ in the OCV relative to the SOC of the first battery cell satisfies $\Delta OCV/\Delta SOC \leq 0.25$, in mV/% SOC; and optionally, when the dynamic SOC of the first battery cell is in the range from 30% to 80%, the change rate $\Delta OCV/\Delta SOC$ is $\leq 0.15$.

In the present application, when the battery module includes battery cells with different OCV change rates in a high SOC range, and the SOC-OCV curves of the two types of battery cells conform to the above characteristics, the change in the overall charge state of the battery module can be accurately characterized by the characteristic that the OCV change of the second type of battery cells in the high SOC is identified easily and accurately, which effectively solves the problem of overcharge of the battery module; meanwhile, a relatively small difference in charge and discharge performance of the first type of battery cells and the second type of battery cells can also be ensured, which helps to improve the overall electrical performance output effect of the battery module.

In some embodiments of the present application, the discharge battery balance rate CB1 of the first battery cell satisfies $1.00 \leq CB1 \leq 1.18$; and optionally, $1.04 \leq CB1 \leq 1.14$. In the present application, when the discharge battery balance rate of the first battery cell is relatively small, such type of battery cells, at the sated of being nearly fully charged, is likely have the problem of lithium deposition due to the small amount of lithium vacancies that can be accommodated in the negative electrode. When the first battery cells are connected in series with the second battery cells, the SOC of the first battery cells can be accurately identified by identifying the real-time charge state of the second battery cells, so as to improve the capability of preventing overcharge of the battery module. In addition, by matching the charge and discharge characteristics of the battery cells of different chemical systems in the battery module in the above way, the utilization of the positive and negative electrode active materials in the first battery cells and the second battery cells can be improved, and the volume and weight energy density of the battery module can be increased. Active ions deintercalated from the positive electrode active material in the second battery cell can also be stored in the negative electrode, the active ions are continuously consumed during the long-term charging and discharging process, and the active ions pre-stored in the negative electrode can supplement the consumed active ions, which is beneficial to prolong the cycle life of the battery module.

In some embodiments of the present application, the positive electrode active material of the first battery cell includes a lithium-containing phosphate represented by formula (III),

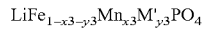  formula (III)

in formula (III), $0 \leq x3 \leq 1$, $0 \leq y3 \leq 0.1$, and M' is one or more selected from transition metal elements and non-transition metal elements other than Fe and Mn.

In some embodiments of the present application, the positive electrode active material of the first battery cell includes one or more of $LiFePO_4$, $LiMnPO_4$, $LiMn_{1-x3}Fe_{x3}PO_4$, and $LiV_{1-x3}Fe_{x3}PO_4$, where x3 independently satisfies $0 \leq x3 < 1$. In the present application, the OCV of the lithium phosphate battery cell changes smoothly with SOC in long SOC range, and is prone to be overcharged in high SOC range; however, the lithium phosphate battery cell has good cycle stability and long service life. Such type of battery cells are used as the first battery cells and connected in series with the second battery cells, thus under the coordination of the second battery cells, the cycle life of the battery module can be effectively prolonged, and good overcharge prevention capability of the battery module can be realized.

In the present application, the positive electrode active material of the first type of battery cells may be pure lithium iron phosphate (LFP), and the positive electrode active material of the second type of battery cells may be a mixture of lithium nickel cobalt manganese oxide (NCM) and LFP. The positive electrode active material of the first type of battery cells may also be a mixture of NCM and LFP, and the positive electrode active material of the second type of battery cells may also be a mixture of NCM and LFP. LFP and NCM here are examples, other materials having similar properties may also be used, without any particular limitation. For example, LFP may also be replaced by $LiMnPO_4$, etc., and NCM may also be replaced by lithium nickel cobalt aluminum oxide (NCA), etc.

Hereinafter, as an example, the positive electrode active material of the first type of battery cells is LFP, and the positive electrode active material of the second type of battery cells is a mixture of NCM and LFP In the present application, when the first type of battery cells has the positive electrode active material of LFP and are charged to above 90% SOC, the OCV changes sharply with the SOC. Due to the accuracy of the BMS, it is difficult to accurately obtain the real-time SOC of the battery cells, and thus is likely to occur safety problem of overcharging. Thus, in the present application, the second type of battery cells using a mixture of NCM and LFP as the positive electrode active material is connected in series in the battery module, and the change rate $\Delta OCV/\Delta SOC$ in the OCV relative to the SOC of the second type of battery cells is in the range from 90% to 98% satisfies $3 \leq \Delta OCV/\Delta SOC \leq 9$. Because the first type of battery cells and the second type of battery cells are electrically connected at least in series, the charge state of the battery module can be accurately reflected by identifying the SOC of the second battery cells, so as to realize charging control on the first type of battery cells, reduce the probability of overcharge, and greatly improve the safety performance of the battery module.

In some other embodiments of the present application, the positive electrode active material of the first battery cell includes at least a layered lithium transition metal oxide represented by formula (IIII),

  formula (IIII)

in formula (IIII), $-0.1 \leq x4 \leq 0.2$, $0.3 \leq a2 < 0.95$, $0 < b2 < 0.3$, $0 < a2+b2+c2 < 1$, $0 \leq y4 < 0.2$, M3 is at least one selected from Mn and Al, M4 is one or more selected from Fe, Cr, Ti, Zn, V, Al, Zr and Ce, and A2 is one or more selected from S, F, Cl and I.

In other embodiments of the present application, the positive electrode active material of the first type of battery cells may also be NCM, and the positive electrode active material for the second type of battery cells may be a mixture of NCM and LFP The discharge battery balance rate CB1 of the first type of battery cells is in a range from 1.00 to 1.18. This battery module, when having the SOC in the range from 90% to 98%, the change rate in the OCV relative to the SOC of the second battery cells is lower than that of the first battery cells, and the BMS can obtain the charge state of the first battery cells more accurately by means of the second battery cells, so as to achieve excellent overcharge prevention performance of the battery module; meanwhile, due to the low initial coulombic efficiency of the NCM in the first battery cells, part of the lithium deintercalated from the positive electrode plate cannot return to the positive electrode plate, but can be pre-stored in the negative electrode plate, so the pre-stored lithium will be gradually released during the use of the battery cells, which can further prolong the cycle life of the battery module.

[Battery Pack]

In an embodiment of the present application, two or more of the above-mentioned battery modules can be assembled into a battery pack, and the number of battery modules included in the battery pack depends on the application of the battery pack and the parameters of a single battery module. The battery pack may include a battery box and a plurality of battery modules disposed in the battery box, the battery box includes an upper box body and a lower box body, and the upper box body can cover the lower box body and match the lower box body well to form a closed space for receiving the battery modules. Two or more battery modules can be arranged in the battery box in a desired manner. In the present application, the "battery pack" is made by further assembling one or more battery modules (or a combination directly formed from a plurality of battery cells) into various control and protection systems such as a battery management system and a thermal management system.

Figure 4:
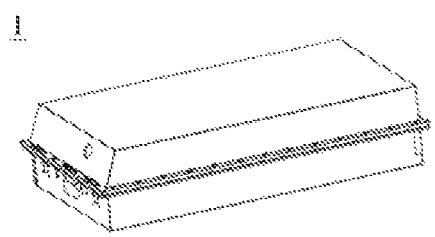
FIG. 4 is a schematic diagram showing an example of a battery pack of the present application.
Figure 5:
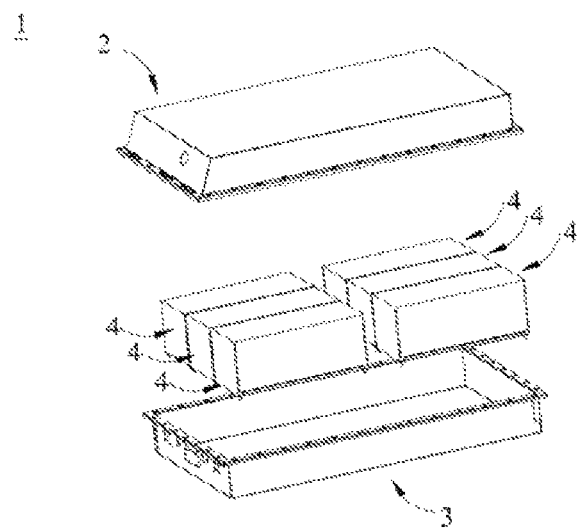
FIG. 5 is an exploded view showing an example of the battery pack of the present application shown in FIG. 4.

FIG. 4 is a schematic diagram showing an example of the battery pack 1 of the present application. FIG. 5 is an exploded view showing an example of the battery pack 1 of the present application shown in FIG. 4. Referring to FIGS. 4 and 5, the battery pack 1 may include a battery box and a plurality of battery modules 4 disposed in the battery box. The battery box includes an upper box body 2 and a lower box body 3. The upper box body 2 is used to cover the lower box body 3 and form a closed space for receiving the battery modules 4. The plurality of battery modules 4 may be arranged in the battery box in any manner.

[Electric Apparatus]

In one embodiment of the present application, the electric apparatus of the present application includes at least one of the battery module or battery pack of the present application, and the battery module or battery pack may be used as a power source of the electric apparatus, and may also be used as an energy storage unit of the electric apparatus. The electric apparatus includes, but is not limited to, a mobile digital apparatus (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck, etc.), an electric train, a ship, a satellite, an energy storage system, etc.

Figure 6:
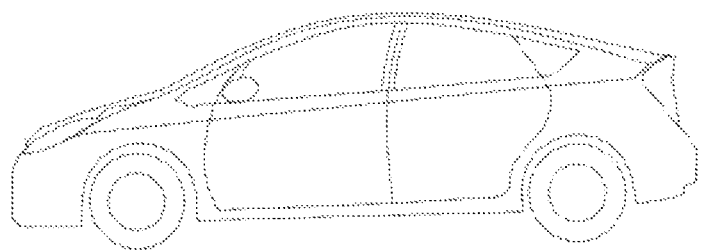
FIG. 6 is a schematic diagram showing an example of an electric apparatus using the battery module of the present application as a power source.

FIG. 6 is a schematic diagram showing an example of the electric apparatus using the battery module of the present application as a power source. The electric apparatus is a pure electric vehicle, a hybrid electric vehicle, or a plug-in hybrid electric vehicle. In order to meet the requirements of the electric apparatus for high power and high energy density, battery packs or battery modules may be used.

[Method for Manufacturing a Battery Module]

The present application provides a method for manufacturing a battery module, including the following steps:

obtaining a first type of battery cells and a second type of battery cells, the first type of battery cells and the second type of battery cells are battery cells of different chemical systems, the first type of battery cells includes N first battery cells, the second type of battery cells includes M second battery cells, N and M are positive integers, the positive electrode plate of the second battery cell contains two or more positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, where SOC represents a charge state and OCV represents an open circuit voltage; and connecting the first type of battery cells and the second type of battery cells at least in series to form the battery module described according to the first aspect of the present application.

[Device for Manufacturing a Battery Module]

The present application proposes a device for manufacturing a battery module, including:

a clamping arm unit, which is used to obtain a first type of battery cells and a second type of battery cells, the first type of battery cells and the second type of battery cells are battery cells of different chemical systems, the first type of battery cells comprises N first battery cells, the second type of battery cells comprises M second battery cells, N and M are positive integers, the positive electrode plate of the second battery cell contains two or more positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, where SOC represents a charge state and OCV represents an open circuit voltage;

an assembling unit, which is used to connect the first type of battery cells and the second type of battery cells at least in series to form the battery module according to the first aspect of the present application; and a control unit, which is used to control the clamping arm unit and the assembling unit.

Therefore, the battery module manufactured by the manufacturing method and manufacturing device of the present application can significantly improve the control accuracy of the BMS, effectively prevent the overcharging phenomenon of the battery cells inside the hybrid series battery module, and greatly improve the safety of the battery module.

EXAMPLES

Hereinafter, the technical solutions of the present application and the advantages thereof are described in detail through specific examples.

"Preparation of Battery Cells"

Referring to GB/T 31484-2015 Cycle life requirements and test methods for traction battery of electric vehicle, the preparation methods of battery cells in the examples and comparative examples are as follows.

1. Preparation of a Positive Electrode Slurry

A positive electrode active material, a conductive carbon Super P, and a binder polyvinylidene fluoride (PVDF), at a weight ratio of 95:3:2, are mixed in an appropriate amount of N-methylpyrrolidone (NMP) solvent under fully stirring, to form a uniform and stable slurry with a viscosity of 15000 mPa·s, and the slurry produces no gelling, stratification or sedimentation and other phenomena within 38 hours of standing.

2. Preparation of a Positive Electrode Plate

The positive electrode material slurry is uniformly coated on a positive electrode current collector Al foil, after drying, the electrode plate is cold-pressed to a designed compaction and is slit for later use, to obtain a positive electrode plate.

3. Preparation of an Electrolyte Solution

An equal volume of ethylene carbonate is dissolved in propylene carbonate, and then lithium hexafluorophosphate is uniformly dissolved in the mixed solvent for later use (the lithium hexafluorophosphate has a concentration of 1.1 M/L) to obtain an electrolyte solution.

4. Preparation of a Negative Electrode Plate

Negative electrode active materials such as graphite, conductive carbon, a binder polystyrene-butadiene copolymer (SBR), a thickener sodium carboxymethylcellulose (CMC), at a weight ratio of 95:2:2:1, are mixed in an appropriate amount of water solvent under fully stirring, to form a uniform and stable negative electrode slurry; the slurry is evenly coated on a negative electrode current collector Cu foil, after drying, the electrode plate is cold-pressed to a designed compactness and is slit for later use.

5. Separator

PP is used as a separator.

6. Preparation of a Battery Cell

The above-mentioned positive electrode plate, separator and negative electrode plate are wound together by using the conventional battery cell manufacturing process to form a bare battery cell, then the bare battery cell is placed in a battery shell, the above-mentioned electrolyte is injected, then the procedures of forming and sealing are carried out, and a rechargeable power battery cell is obtained.

"Assembly of a Battery Module"

10 the first type of battery cells and 10 the second type of battery cells are taken, and the first type of battery cells and the second type of battery cells are arranged at intervals and electrically connected in series.

"Method for Testing OCV Change Curve of a Battery Cell in a Range from 0% to 100% SOC"

A method for testing an OCV change curve of a battery cell in a range from 0% to 100% SOC includes the following steps:

1) standing the battery cell for 120 minutes at room temperature of 25° C.;
2) discharging the battery cell at a constant current of 0.33 C to a discharge termination voltage (wherein C is a nominal or rated capacity in the technical specification of the product), and standing for 30 minutes;
3) charging the battery cell of the above step 2 at the constant current of 0.33 C to a charge termination voltage, at a constant voltage to the current of <0.05 C, and standing for 30 minutes;
4) discharging the battery cell of the above step 3 at a constant current of 0.33 C to the discharge termination voltage, wherein the discharged capacity is recorded as $C_0$, and standing for 30 minutes;
5) charging the battery cell of the above step 4 above at a constant current of 0.33 $C_0$ to the charge termination voltage, and at a constant voltage to the current of ≤0.05 $C_0$, and standing for 30 minutes;
6) discharging the battery cell of the above step 5 at a constant current of ≤0.05 $C_0$ to the discharge termination voltage (a sampling frequency of 1 s is required), and standing for 30 minutes; and
7) charging the battery cell of the above step 6 at a constant current of 0.05 $C_0$ to the charge termination voltage (a sampling frequency of 1 s is required), and standing for 30 minutes.

In the above steps, discharging at a rate of 0.33 C refers to a discharge rate parameter when the battery cell having 1 C capacity is fully charged or fully discharged for 3 h; when the discharge rate of 0.33 C0 is used for discharging for 9.09 min, the discharged capacity is equal to 9.09 min/180 min=0.05, which is 5% of the total capacity C0. In addition, the nominal current can be freely selected according to the capacity of the battery module. For example, when the capacity of the battery module is 50 Ah, the nominal current may be 50 A. For another example, when the capacity of the battery module is 100 Ah, the nominal current may be 100 A. The charge termination voltage and the discharge termination voltage can be determined by referring to the provisions in the technical specification of the product or the GBT certification documents for battery cells/battery modules.

"Method for Testing the Discharge Battery Balance Rate of a Battery Cell"

Testing the discharge capacity of the negative electrode plate per unit area and the discharge capacity of the positive electrode plate per unit area respectively; and then calculating the discharge battery balance rate of the battery cell according to the formula the discharge battery balance rate of the battery cell=the discharge capacity of the negative electrode plate per unit area/the charge capacity of the positive electrode plate per unit area.

The discharge capacity of the positive electrode plate or the negative electrode plate can be tested by the following steps:

(1) Sampling electrode plate according to requirements as follows:

Disassembling the battery cell after fully discharged, appropriately washing the positive electrode plate and the negative electrode plate with a DMC solution, and drying for later use. The positive electrode plate is sampled at any position at the middle part that is greater than 15 mm away from the edge. The negative electrode plate is sampled at the position opposite to the selected positive electrode plate. The sample area of the positive electrode plate is the same as that of the negative electrode plate;

(2) Assembling a button half cell by combining the above cut positive electrode plate and negative electrode plate with a lithium plate as counter electrodes respectively;

(3) Testing the discharge capacity of the negative electrode plate per unit area:

Testing the discharge capacity of the button half cell for no less than 10 parallel samples at the test voltage from 0.05 V to 2.0 V, the test temperature of 25° C., and the charge/discharge rate of 0.1 C, to obtain the discharge capacity of the negative electrode plate for this area by averaging the tested values after removing the minimum and maximum ones; and dividing the discharge capacity of the negative electrode plate as obtained in the above test by the area of the negative electrode plate to obtain the discharge capacity of the negative electrode plate per unit area; and (4) Testing the discharge capacity of the positive electrode plate per unit area:

Testing the discharge capacity of the button half cell for no less than 10 parallel samples at the working voltage of specified in the GBT certification document, the test temperature of 25° C., and the charge/discharge rate of 0.1 C, to obtain the discharge capacity of the positive electrode plate for this area by averaging the tested values after removing the minimum and maximum ones; and dividing the discharge capacity of the positive electrode plate as obtained in the above test by the area of the positive electrode plate to obtain the discharge capacity of the positive electrode plate per unit area.

Method for Testing the Capacity Retention Rate of the Battery Module

GB/T 31484-2015 Cycle life requirements and test methods for traction batter of electric vehicle is referred.

Method for testing a capacity retention rate of 1500 cycles (25° C.):

The initial capacity (denoted as: Cap0) is tested according to the test steps as follows:

1) standing a newly delivered battery module for 30 minutes at 25° C.;
2) discharging the battery module at a constant current of 0.33 C to a discharge termination voltage, and standing for 30 minutes;
3) charging the battery module at the constant current of 0.33 C to a charge termination voltage, and to the current of <0.05C at a constant voltage, and standing for 5 minutes;
4) discharging the battery module at the constant current of 0.33 C to the discharge termination voltage, and then standing for 5 minutes.

The discharge capacity measured in step 3) to step 4) is denoted as Cap0. Steps 1) to 4) are a charge and discharge cycle of the battery module. Steps 1) to 4) as above are repeated for 1500 times, the discharge capacity measured at the 1500th time is denoted as Capn, and the capacity retention rate at the 1500th time is: Capn/Cap0×100%.

In the above test, C represents a rated capacity of the battery cell, the charge/discharge current is a rate multiplied by the rated capacity of the battery cell, and the rated capacity is subject to the capacity of the battery cell identified in the GBT certification document of the battery cell, or the battery module of the battery cell, or the battery pack of the battery cell.

"Method for Detecting Overcharging and Lithium Deposition of the Battery Module"

At 25±2° C., the battery module is charged at a constant current rate of 1 C to an upper limit cut-off voltage (the upper limit cut-off voltage of the battery module can be formulated with reference to the specification of the battery module), then charged at the constant upper limit cut-off voltage to the current of 0.05 C, and stood for 30 minute. Then the battery module is fixed and placed on an overcharge safety test device, and the ambient temperature is controlled at 25±2° C. After standing for 5 min, the battery module at state of being fully charged is overcharged at the rate of 1 C, and the real-time voltage and temperature changes of each battery cell are recorded until the charging stops. 6 battery modules are tested in each example and comparative example, the first type of battery cell in the battery module is disassembled to observe lithium deposition on the surface of the negative electrode plate, and the number of lithium deposition cells is recorded.

Through the above method of preparation of battery cells, battery modules of Examples 1-7 and battery modules of Comparative Examples 1 and 2 below can be obtained.

Example 1

In the first type of battery cells, the positive electrode active material was $LiFePO_4$, the discharge battery balance rate CB1 was 1.04, and the change rate $\Delta OCV/\Delta SOC$ in the OCV relative to SOC of the first type of battery cells was 0.07 when the SOC was in the range from 30% to 80%, and was 0.28 when the SOC was in the range from 90% to 98%.

In the second type of battery cells, the positive electrode active material was a mixture of $LiFePO_4$(LFP) and $LiNi_{0.55}Co_{0.12}Mn_{0.33}O_2$(NCM), the mixing ratio was LFP:NCM=0.99:0.01, the discharge battery balance rate CB2 was 1.11, and the change rate $\Delta OCV/\Delta SOC$ in the OCV relative to SOC of the second type of battery cells was 0.08 when the SOC was in the range from 30% to 80%, and was 8.89 when the SOC was in the range from 90% to 98%.

Examples 2-7 and Comparative Examples 1 and 2

In Examples 2-7 and Comparative Examples 1 and 2, the battery module also included 10 first type of battery cells and 10 second type of battery cells, wherein the discharge battery balance rates CB1 of the first type of battery cells and that of the second type of battery cells CB2 were the same with those in Example 1, except for the differences shown in Table 1.

TABLE 1

| | Positive electrode active material of first type of battery cells | Positive electrode active material of first type of battery cells and mass ratio | $\Delta OCV/\Delta SOC$ of first type of battery cells (30%-80% SOC) | $\Delta OCV/\Delta SOC$ of first type of battery cells (90%-98% SOC) | $\Delta OCV/\Delta SOC$ of second type of battery cells (30%-80% SOC) | $\Delta OCV/\Delta SOC$ of second type of battery cells (90%-98% SOC) | $\Delta OCV/\Delta SOC$ ratio Q of first and second types of battery cells | Number of lithium-deposition cells of first type when the battery module is overcharged | Capacity retention rate of battery module at 1500th cycle |
|---|---|---|---|---|---|---|---|---|---|
| Example 1 | $LiFePO_4$ | LFP:NCM = 99:1 | 0.07 | 0.28 | 0.08 | 8.89 | 31.75 | 2/10 | 89% |
| Example 2 | $LiFe_{0.99}Ti_{0.01}PO_4$ | LFP:NCM = 95:5 | 0.09 | 0.31 | 0.11 | 6.73 | 21.71 | 1/10 | 91% |
| Example 3 | $LiFe_{0.98}Ti_{0.02}PO_4$ | LFP:NCM = 90:10 | 0.15 | 0.42 | 0.15 | 4.51 | 10.74 | 0/10 | 92% |
| Example 4 | $LiFe_{0.98}Mn_{0.02}PO_4$ | LFP:NCM = 85:15 | 0.14 | 0.44 | 0.32 | 3.98 | 9.05 | 0/10 | 94% |
| Example 5 | $LiFe_{0.99}Mn_{0.01}PO_4$ | LFP:NCM = 70:30 | 0.13 | 0.69 | 0.57 | 3.07 | 4.45 | 0/10 | 93% |
| Example 6 | $LiFe_{0.98}Al_{0.02}PO_4$ | LFP:NCM = 80:20 | 0.11 | 0.63 | 0.31 | 3.88 | 6.16 | 0/10 | 93% |
| Example 7 | $LiNi_{0.55}Co_{0.12}Mn_{0.33}O_2$ | LFP:NCM = 80:20 | 0.88 | 1.31 | 0.31 | 3.92 | 2.99 | 0/10 | 91% |

TABLE 1-continued

|  | Positive electrode active material of first type of battery cells | Positive electrode active material of first type of battery cells and mass ratio | ΔOCV/ΔSOC of first type of battery cells (30%-80% SOC) | ΔOCV/ΔSOC of first type of battery cells (90%-98% SOC) | ΔOCV/ΔSOC of second type of battery cells (30%-80% SOC) | ΔOCV/ΔSOC of second type of battery cells (90%-98% SOC) | ΔOCV/ΔSOC ratio Q of first and second types of battery cells | Number of lithium-deposition cells of first type when the battery module is over-charged | Capacity retention rate of battery module at 1500th cycle |
|---|---|---|---|---|---|---|---|---|---|
| Comparative Example 1 | LiFePO$_4$4 | LiFePO$_4$ | 0.15 | 0.35 | 0.15 | 0.71 | 2.03 | 8/10 | 66% |
| Comparative Example 2 | LiFePO$_4$ | NCM | 0.14 | 0.44 | 4 | 1.53 | 3.48 | 5/10 | 75% |

As shown in Table 1 as above, the probability of lithium deposition due to overcharge of the first type of battery cells in Example 1 was 2/10, the probability of lithium deposition due to overcharge of the first type of battery cells in Example 2 was 1/10, and the probability of lithium deposition due to overcharge of the first type of battery cells in Examples 3-7 was 0/10.

On the other hand, in Comparative Example 1, both the first type of battery cells and the second type of battery cells were LFP, and the change rate ΔOCV/ΔSOC in the OCV relative to the SOC was 0.71 when the SOC of the battery module was in the range from 90% to 98% during charging. Thus, the change rates ΔOCV/ΔSOC of the first and second types of battery cells in the battery module changed slowly, the probability of lithium evolution due to overcharge of the first type of battery cells in the battery module of Comparative Example 1 was very high (8/10).

In Comparative Example 2, although the change rate ΔOCV/ΔSOC in the OCV relative to the SOC was 1.53 when the SOC of the second type of battery cells was in the range from 90% to 98% during charging, the probability of lithium deposition due to overcharge of the first type of battery cells in the battery module of Comparative Example 2 was still high (5/10), because the positive electrode active material for the first type of battery cells was LFP, and the positive electrode active material for the second type of battery cells was NCM, without any optimized design for the doping of the positive electrode active material of the first type of battery cells or the second type of battery cells.

Hence, in the present application, the first type of battery cells and the second type of battery cells of different chemical systems were connected in series, and the change rate ΔOCV/ΔSOC in the OCV relative to the SOC, when the second type of battery cells was nearly fully charged, was adjusted to the range of 3-9 mV/% SOC, through this optimized design, the probability of lithium deposition due to overcharge of the first type of battery cells in the battery modules of Examples 1-7 was greatly reduced compared with the battery modules that were not subjected to optimization design in Comparative Examples 1 and 2. As a result, the safety of the battery module was significantly improved.

In addition, according to Table 1 as above, in the present application, through the optimized design of the doping of the positive electrode active material of the first type of battery cells or the second type of battery cells, the capacity retention rate, at the 1500th cycle, of the battery modules of Examples 1-7 after the optimization design was significantly improved compared with the battery modules that were not subjected to optimization design in Comparative Examples 1 and 2. As a result, the service life of the battery module was prolonged.

<Regarding the Design of Discharge Battery Balance Rate of the Second Battery Cell>

Hereinafter, the technical solutions of the present application and the advantages thereof are described in detail through specific examples.

The battery cells were prepared by the method similar to the preparation of battery cells in Examples 1-7 above. The first type of battery cells in Examples 8-12 were the same as those in Example 3, except for the difference in the specific parameters of the second type of battery cells in Examples 8-12.

TABLE 2

|  | First type of battery cells | Second type of battery cells Positive electrode active material and mass ratio | Second type of battery cells Discharge cell balance rate CB2 | ΔOCV/ΔSOC of second type of battery cells (30%-80% SOC) | ΔOCV/ΔSOC of second type of battery cells (90%-98% SOC) | ΔOCV/ΔSOC ratio Q of first and second types of battery cells | Number of lithium-deposition cells of first type when the battery module is over-charged | Capacity retention rate of battery module at 1500th cycle |
|---|---|---|---|---|---|---|---|---|
| Example 3 | Active material LiFe$_{0.98}$Ti$_{0.02}$PO$_4$ CB1 = 1.04, ΔOCV/ΔSOC | LFP: NCM = 90:10 | 1.11 | 0.15 | 4.51 | 10.74 | 0/10 | 92% |
| Example 8 | | | 1.03 | 0.21 | 4.63 | 11.02 | 0/10 | 92% |
| Example 9 | | | 1.08 | 0.17 | 4.56 | 10.86 | 0/10 | 93% |
| Example 10 | | | 1.16 | 0.13 | 4.42 | 10.52 | 0/10 | 91% |

TABLE 2-continued

| | First type of battery cells | Second type of battery cells Positive electrode active material and mass ratio | Second type of battery cells Discharge cell balance rate CB2 | $\Delta OCV/\Delta SOC$ of second type of battery cells (30%-80% SOC) | $\Delta OCV/\Delta SOC$ of second type of battery cells (90%-98% SOC) | $\Delta OCV/\Delta SOC$ ratio Q of first and second types of battery cells | Number of lithium-deposition cells of first type when the battery module is over-charged | Capacity retention rate of battery module at 1500th cycle |
|---|---|---|---|---|---|---|---|---|
| Example 11 | at 30%-80% SOC:0.15 mV/% SOC, $\Delta OCV/\Delta SOC$ at 90%-98% SOC: 0.42 mV/% SOC | | 0.95 | 0.32 | 5.08 | 12.10 | 1/10 | 91% |
| Example 12 | | | 1.20 | 0.11 | 4.21 | 10.02 | 0/10 | 90% |

As shown in Table 2 as above, in Examples 3 and 8-10 wherein tB2 of the second type of battery cells satisfied 1.00≤CB2≤1.16, the probability of lithium deposition due to overcharge of the first type of battery cells in the battery module was extremely low, and the capacity retention rate of the battery module at the 1500th cycle was maintained at a relatively high level. On the contrary, in Example 11 wherein CB2 of the second type of battery cells did not satisfy 1.00≤CB2≤1.16, the probability of lithium deposition due to overcharge of the first type of battery cells in the battery module was not zero. In addition, in Example 12 wherein CB2 of the second type of battery cells did not satisfy 1.00≤CB2≤1.16, although the probability of lithium deposition due to overcharge of the first type of battery cells in the battery module was also low, the capacity retention rate of the battery module at the 1500th cycle was relatively low.

It can be seen that, in the battery modules of the examples of the present application, when the high SOC change characteristic of the second battery cells was controlled, and when the discharge battery balance rate of the second battery cells was further limited in the range from 1 to 1.16, the overcharge of the battery cells inside the series hybrid battery module can be further effectively prevented, the safety of the battery module was greatly improved, and the service life of the battery module could also be prolonged.

<Regarding the Design of Discharge Battery Balance Rate of the First Battery Cell>

Hereinafter, the technical solutions of the present application and the advantages thereof are described in detail through specific examples.

The battery cells were prepared by the method similar to the preparation of battery cells in Examples 1-7 as above. The second battery cells in Examples 13-21 were the same as those in Example 3, except that the specific parameters of the first battery cells in Examples 13-21, see Table 3 for details.

TABLE 3

| | First type of battery cells Positive electrode active material | First type of battery cells Discharge battery balance rate CB1 | $\Delta OCV/\Delta SOC$ of first type of battery cells (30%-80% SOC) | $\Delta OCV/\Delta SOC$ of first type of battery cells (90%-98% SOC) | $\Delta OCV/\Delta SOC$ ratio of first and second types of battery cells Q | Second type of battery cells | Numbers of lithium-depositing cells of first type when the battery module is over-charged | Capacity retention rate of battery module at 1500th cycle |
|---|---|---|---|---|---|---|---|---|
| Example 3 | $LiFe_{0.98}Ti_{0.02}PO_4$ | 1.04 | 0.15 | 0.42 | 10.74 | Second type of battery cells Active materials LFP: NCM = 90:10 CB2 = 1.11, $\Delta OCV/\Delta SOC$ at 30%-80% SOC: 0.15 mV/% SOC, $\Delta OCV/\Delta SOC$ at 90%-98% SOC: 4.51 mV/% SOC | 0/10 | 92% |
| Example 13 | $LiFePO_4$ | 1.00 | 0.11 | 0.65 | 6.94 | | 1/10 | 93% |
| Example 14 | $LiFePO_4$ | 1.10 | 0.11 | 0.43 | 10.49 | | 0/10 | 91% |
| Example 15 | $LiFePO_4$ | 1.14 | 0.11 | 0.37 | 12.19 | | 0/10 | 89% |
| Example 16 | $LiNi_{0.55}Co_{0.12}Mn_{0.33}O_2$ | 1.14 | 0.95 | 1.26 | 3.58 | | 0/10 | 91% |
| Example 17 | $LiNi_{0.55}Co_{0.12}Mn_{0.33}O_2$ | 1.18 | 0.87 | 1.21 | 3.73 | | 0/10 | 90% |
| Example 18 | $LiFePO_4$ | 0.95 | 0.10 | 0.68 | 6.63 | | 1/10 | 83% |
| Example 19 | $LiFePO_4$ | 1.20 | 0.11 | 0.25 | 18.04 | | 0/10 | 90% |
| Example 20 | $LiNi_{0.55}Co_{0.12}Mn_{0.33}O_2$ | 0.95 | 0.81 | 1.63 | 2.77 | | 0/10 | 87% |
| Example 21 | $LiNi_{0.55}Co_{0.12}Mn_{0.33}O_2$ | 1.21 | 0.97 | 1.09 | 4.14 | | 0/10 | 89% |

As shown in Table 3 as above, in Examples 3 and 13-17 wherein CB1 of the first type of battery cells satisfied 1.00≤CB1≤1.18, the probability of lithium deposition due to overcharge of the first type of battery cells in the battery module was extremely low, and the capacity retention rate of the battery module at the 1500th cycle was maintained at a relatively high level. On the contrary, in Examples 18-21 wherein CB1 of the first type of battery cells did not satisfy 1.00≤CB1≤1.18, although the probability of lithium deposition due to overcharge of the first type of battery cells in the battery module was also low, the capacity retention rate of the battery module at the 1500th cycle was relatively low.

In the battery modules of the examples of the present application, the curvature characteristics of the second type of battery cells range were set in the high SOC, and the discharge battery balance rate of the first type of battery cells was further optimized. As a result, the overcharge of the battery cells inside the hybrid series battery module was effectively prevented, the safety of the battery module was greatly improve, and the service life of the battery module was further prolonged.

Some exemplary embodiments of the present invention are provided as follows:

Embodiment 1. A battery module, comprising a first type of battery cells and a second type of battery cells connected at least in series, wherein the first type of battery cells and the second type of battery cells are battery cells of different chemical system,
the first type of battery cells comprises N first battery cells,
the second type of battery cells comprises M second battery cells, and N and M are positive integers;
a positive electrode plate of the second battery cell contains two or more positive electrode active materials, and when a dynamic SOC of the second battery cell is in a range from 90% to 98%, a change rate ΔOCV/ΔSOC in an OCV relative to the SOC of the second battery cell satisfies: 3≤ΔOCV/ΔSOC≤9, in mV/% SOC, where SOC represents a charge state and OCV represents an open circuit voltage.

Embodiment 2. The battery module according to claim 1, wherein
when the dynamic SOC of the second battery cell is in the range from 90% to 98%, the change rate ΔOCV/ΔSOC in the OCV relative to the SOC of the second battery cell satisfies: 3.5≤ΔOCV/ΔSOC≤7, in mV/% SOC.

Embodiment 3. The battery module according to claim 1 or 2, wherein
when the dynamic SOC of the second battery cell is in a range from 30% to 80%, the change rate ΔOCV/ΔSOC in the OCV relative to the SOC of the second battery cell satisfies: ΔOCV/ΔSOC≤1, in mV/% SOC; and
optionally, when the dynamic SOC of the second battery cell is in the range from 30% to 80%, the change rate ΔOCV/ΔSOC in the OCV relative to the SOC of the second battery cell satisfies: ΔOCV/ΔSOC≤0.25, in mV/% SOC.

Embodiment 4. The battery module according to any one of claims 1-3, wherein
a discharge battery balance rate CB2 of the second battery cell satisfies 1.00≤CB2≤1.16, and optionally 1.03≤CB2≤1.11.

Embodiment 5. The battery module according to any one of claims 1-4, wherein
the positive electrode active material of the second battery cell comprises at least a layered lithium transition metal oxide represented by formula (I) and a lithium-containing phosphate represented by formula (II),

in formula (I), −0.1≤x1≤0.2, 0.3≤a1<0.97, 0<b1≤0.3, 0<a1+b1+c1<1, 0≤y1<0.2, M1 is at least one selected from Mn and Al, M2 is one or more selected from Fe, Cr, Ti, Zn, V, Al, W, Mg, B, Cu, Y, Si, Sr, Zr and Ce, and A1 is one or more selected from S, N, F, Cl, Br, $PO_4^{3-}$ and I; optionally, 0.5≤a1≤0.7, and 0.01≤b1≤0.15; and in formula (II), 0≤x2≤1, optionally, 0≤x2≤0.5, 0≤y2≤0.1, and M' is one or more selected from transition metal elements and non-transition metal elements other than Fe and Mn.

Embodiment 6. The battery module according to claim 5, wherein
in the positive electrode active material of the second battery cell, the layered lithium transition metal oxide represented by formula (I) has a mass percentage from 0.5 wt % to 30 wt %, optionally from 1 wt % to 20 wt %, and further optionally from 3 wt % to 15 wt %.

Embodiment 7. The battery module according to any one of claims 1 to 6, wherein the first battery cell satisfies condition 1 and condition 2,
condition 1: when the dynamic SOC of the battery module is in the range from 90% to 98%, the ratio Q of ΔOCV/ΔSOC of the second battery cell to ΔOCV/ΔSOC of the first battery cell is 2<Q≤40, and optionally is 4≤Q≤32;
condition 2: when the dynamic SOC of the first battery cell is in the range from 30% to 80%, the change rate ΔOCV/ΔSOC in the OCV relative to the SOC of the first battery cell satisfies ΔOCV/ΔSOC≤0.25, in mV/% SOC; and optionally, the change rate ΔOCV/ΔSOC is ≤0.15 when the dynamic SOC of the first battery cell is in the range from 30% to 80%.

Embodiment 8. The battery module according to any one of claims 1-7, wherein
the discharge battery balance rate CB1 of the first battery cell satisfies 1.00≤CB1≤1.18; and optionally, 1.04≤CB1≤1.14.

Embodiment 9. The battery module according to any one of claims 1-7, wherein
the positive electrode active material of the first battery cell comprises a lithium-containing phosphate represented by formula (III),

in formula (III), 0≤x3≤1, 0≤y3≤0.1, and M" is one or more selected from transition metal elements and non-transition metal elements other than Fe and Mn;
optionally, the positive electrode active material of the first battery cell comprises one or more of $LiFePO_4$, $LiMnPO_4$, $LiMn_{1-x3}Fe_{x3}PO_4$, and $LiV_{1-x3}Fe_{x3}PO_4$, where x3 independently satisfies 0<x3<1.

Embodiment 10. The battery module according to any one of claims 1-9, wherein
the positive electrode active material of the first battery cell comprises a layered lithium transition metal oxide represented by formula (IIII),

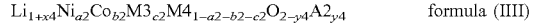

in formula (IIII), −0.1≤x4≤0.2, 0.3≤a2<0.95, 0<b2<0.3, 0<a2+b2+c2<1, 0≤y4<0.2, M3 is at least one selected from Mn and Al, M4 is one or more selected from Fe, Cr, Ti, Zn, V, Al, Zr and Ce, and A2 is one or more selected from S, F, Cl and I.

Embodiment 11. A battery pack, comprising the battery module according to any one of claims 1-10.

Embodiment 12. An electric apparatus, comprising the battery module according to any one of claims 1-10 or the battery pack according to claim 11, wherein the battery module or the battery pack is used as a power source or an energy storage unit of the electric apparatus.

Embodiment 13. A method for manufacturing a battery module, comprising the following steps:

obtaining a first type of battery cells and a second type of battery cells, wherein the first type of battery cells and the second type of battery cells are battery cells of different chemical systems, the first type of battery cells comprises N first battery cells, the second type of battery cells comprises M second battery cells, N and M are positive integers, the positive electrode plate of the second battery cell contains two or more than two positive electrode active materials, and when a dynamic SOC of the second battery cell is in a range from 90% to 98%, a change rate $\Delta OCV/\Delta SOC$ in an OCV to the SOC of the second battery cell relative satisfies $3 \leq \Delta OCV/\Delta SOC \leq 9$, where SOC represents a charge state and OCV represents an open circuit voltage; and connecting the first type of battery cells and the second type of battery cells at least in series to form the battery module according to any one of claims 1-10.

Embodiment 14. A device for manufacturing a battery module, characterized in comprising:

a clamping arm unit, which is used to obtain a first type of battery cells and a second type of battery cells, the first type of battery cells and the second type of battery cells are battery cells of different chemical systems, the first type of battery cells comprises N first battery cells, the second type of battery cells comprises M second battery cells, N and M are positive integers, the positive electrode plate of the second battery cell contains two or more than two positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, where SOC represents a charge state and OCV represents an open circuit voltage;

an assembling unit, which is used to connect the first type of battery cells and the second type of battery cells at least in series to form the battery module according to any one of claims 1-10; and a control unit, which is used to control the clamping arm unit and the assembling unit.

The embodiments or implementations in this specification are described in a progressive manner, each embodiment focuses on the differences from other embodiments, and the same or similar parts between the various embodiments may be referred to each other.

In the description of this specification, the description with reference to the terms "one embodiment", "some embodiments", "exemplary embodiments", "examples", "specific examples", or "some examples" and the like means that the specific features, structures, materials, or characteristics described in combination with the embodiments or examples are included in at least one embodiment or example of the present application. In this specification, the schematic expression of the above-mentioned terms does not necessarily refer to the same embodiment or example. Moreover, the described specific features, structures, materials or characteristics can be combined in any one or more embodiments or examples in a suitable manner.

Finally, it should be noted that the above embodiments are only used to illustrate the technical solutions of the present application, rather than limiting the present application. Although the present application has been described in detail with reference to the foregoing embodiments, those of ordinary skill in the art should understood that modifications can still be made to the technical solutions recorded in the foregoing embodiments, or equivalent replacements are made to some or all of the technical features; and these modifications or replacements do not make the essence of the corresponding technical solutions deviate from the scope of the technical solutions of the embodiments of the present application.

What is claimed is:

1. A battery module, comprising a first type of battery cells and a second type of battery cells connected at least in series, wherein the first type of battery cells and the second type of battery cells are battery cells of different chemical system, the first type of battery cells comprises N first battery cells, the second type of battery cells comprises M second battery cells, and N and M are positive integers;

a positive electrode plate of the second battery cell contains two or more positive electrode active materials, and when a dynamic SOC of the second battery cell is in a range from 90% to 98%, a change rate $\Delta OCV/\Delta SOC$ in an OCV relative to the SOC of the second battery cell satisfies: $3 \leq \Delta OCV/\Delta SOC \leq 9$, in mV/% SOC, where SOC represents a charge state and OCV represents an open circuit voltage, and when a dynamic SOC of the battery module is in the range from 90% to 98%, a ratio Q of $\Delta OCV/\Delta SOC$ of the second battery cell to $\Delta OCV/\Delta SOC$ of the first battery cell is $2 \leq Q \leq 40$, wherein the positive electrode active material of the first battery cell comprises a lithium-containing phosphate represented by formula (III),

$$\text{LiFe}_{1-x3-y3}\text{Mn}_{x3}\text{M}''_{y3}\text{PO}_4 \qquad \text{formula (III)}$$

in formula (III), $0 \leq x3 \leq 1$, $0 \leq y3 \leq 0.1$, and M' is one or more selected from transition metal elements and non-transition metal elements other than Fe and Mn, or the positive electrode active material of the first battery cell comprises a layered lithium transition metal oxide represented by formula (IIII),

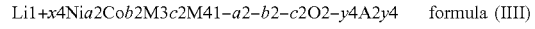

$$\text{Li}_{1+x4}\text{Ni}_{a2}\text{Co}_{b2}\text{M3}_{c2}\text{M4}_{1-a2-b2-c2}\text{O}_{2-y4}\text{A2}_{y4} \qquad \text{formula (IIII)}$$

in formula (IIII), $-0.1 \leq x4 \leq 0.2$, $0.3 \leq a2 < 0.95$, $0 < b2 < 0.3$, $0 < a2+b2+c2 < 1$, $0 \leq y4 < 0.2$, M3 is at least one selected from Mn and Al, M4 is one or more selected from Fe, Cr, Ti, Zn, V, Al, Zr and Ce, and A2 is one or more selected from S, F, Cl and I, and wherein the positive electrode active material of the second battery cell comprises at least a layered lithium transition metal oxide represented by formula (I) and a lithium-containing phosphate represented by formula (II), $$Li_{1+x1}Ni_{a1}Co_{b1}M1_{c1}M2_{1-a1-b1-c1}O_{2-y1}A1_{y1} \quad \text{formula (I)}$$

$$LiFe_{1-x2-y2}Mn_{x2}M'_{y2}PO_4 \quad \text{formula (II)}$$

in formula (I), $-0.1 \leq x1 \leq 0.2$, $0.3 \leq a1 < 0.97$, $0 < b1 \leq 0.3$, $0 < a1+b1+c1 < 1$, $0 \leq y1 < 0.2$, M1 is at least one selected from Mn and Al, M2 is one or more selected from Fe, Cr, Ti, Zn, V, Al, W, Mg, B, Cu, Y, Si, Sr, Zr and Ce, and A1 is one or more selected from S, N, F, Cl, Br, PO43- and I; and in formula (II), $0 \leq x2 \leq 1$, $0 \leq y2 \leq 0.1$, and M' is one or more selected from transition metal elements and non-transition metal elements other than Fe and Mn.

2. The battery module according to claim 1, wherein when the dynamic SOC of the second battery cell is in the range from 90% to 98%, the change rate $\Delta OCV/\Delta SOC$ in the OCV relative to the SOC of the second battery cell satisfies: $3.5 \leq \Delta OCV/\Delta SOC \leq 7$, in mV/% SOC.

3. The battery module according to claim 1, wherein when the dynamic SOC of the second battery cell is in a range from 30% to 80%, the change rate $\Delta OCV/\Delta SOC$ in the OCV relative to the SOC of the second battery cell satisfies: $\Delta OCV/\Delta SOC \leq 1$, in mV/% SOC.

4. The battery module according to claim 1, wherein a discharge battery balance rate CB2 of the second battery cell satisfies $1.00 \leq CB2 \leq 1.16$.

5. The battery module according to claim 1, wherein in formula (I), $0.5 \leq a1 \leq 0.7$, and $0.01 \leq b1 \leq 0.15$; and in formula (II), $0 \leq x2 \leq 0.5$.

6. The battery module according to claim 5, wherein in the positive electrode active material of the second battery cell, the layered lithium transition metal oxide represented by formula (I) has a mass percentage from 0.5 wt % to 30 wt %.

7. The battery module according to claim 1, wherein the first battery cell satisfies condition 1 and condition 2,
condition 1: when the dynamic SOC of the battery module is in the range from 90% to 98%, the ratio Q of $\Delta OCV/\Delta SOC$ of the second battery cell to $\Delta OCV/\Delta SOC$ of the first battery cell is $2 < Q \leq 40$;
condition 2: when the dynamic SOC of the first battery cell is in the range from 30% to 80%, the change rate $\Delta OCV/\Delta SOC$ in the OCV relative to the SOC of the first battery cell satisfies $\Delta OCV/\Delta SOC \leq 0.25$, in mV/% SOC.

8. The battery module according to claim 1, wherein the discharge battery balance rate CB1 of the first battery cell satisfies $1.00 \leq CB1 \leq 1.18$.

9. The battery module according to claim 1, wherein the positive electrode active material of the first battery cell comprises one or more of LiFePO4, LiMnPO4, LiMn1-x3Fex3PO4, and LiV1-x3Fex3PO4, where x3 independently satisfies $0 < x3 < 1$.

10. A battery pack, comprising the battery module according to claim 1.

11. An electric apparatus, comprising the battery module according to claim 1, wherein the battery module or the battery pack is used as a power source or an energy storage unit of the electric apparatus.

12. An electric apparatus, comprising the battery pack according to claim 10, wherein the battery module or the battery pack is used as a power source or an energy storage unit of the electric apparatus.

13. A method for manufacturing a battery module, comprising the following steps:

obtaining a first type of battery cells and a second type of battery cells, wherein
the first type of battery cells and the second type of battery cells are battery cells of different chemical systems,
the first type of battery cells comprises N first battery cells,
the second type of battery cells comprises M second battery cells, N and M are positive integers,
the positive electrode plate of the second battery cell contains two or more than two positive electrode active materials, and when a dynamic SOC of the second battery cell is in a range from 90% to 98%, a change rate $\Delta OCV/\Delta SOC$ in an OCV to the SOC of the second battery cell relative satisfies $3 \leq \Delta OCV/\Delta SOC \leq 9$, where SOC represents a charge state and OCV represents an open circuit voltage, and when a dynamic SOC of the battery module is in the range from 90% to 98%, a ratio Q of $\Delta OCV/\Delta SOC$ of the second battery cell to $\Delta OCV/\Delta SOC$ of the first battery cell is $2 \leq Q \leq 40$,
wherein
the positive electrode active material of the first battery cell comprises a lithium-containing phosphate represented by formula (III), $$LiFe_{1-x3-y3}Mn_{x3}M''_{y3}PO_4 \quad \text{formula (III)}$$

in formula (III), $0 \leq x3 \leq 1$, $0 \leq y3 \leq 0.1$, and M' is one or more selected from transition metal elements and non-transition metal elements other than Fe and Mn,
or
the positive electrode active material of the first battery cell comprises a layered lithium transition metal oxide represented by formula (IIII), $$Li_{1+x4}Ni_{a2}Co_{b2}M3_{c2}M4_{1-a2-b2-c2}O_{2-y4}A2_{y4} \quad \text{formula (IIII)}$$

in formula (IIII), $-0.1 \leq x4 \leq 0.2$, $0.3 \leq a2 < 0.95$, $0 < b2 < 0.3$, $0 < a2+b2+c2 < 1$, $0 \leq y4 < 0.2$, M3 is at least one selected from Mn and Al, M4 is one or more selected from Fe, Cr, Ti, Zn, V, Al, Zr and Ce, and A2 is one or more selected from S, F, Cl and I, and
wherein
the positive electrode active material of the second battery cell comprises at least a layered lithium transition metal oxide represented by formula (I) and a lithium-containing phosphate represented by formula (II), $$Li_{1+x1}Ni_{a1}Co_{b1}M1_{c1}M2_{1-a1-b1-c1}O_{2-y1}A1_{y1} \quad \text{formula (I)}$$

$$LiFe_{1-x2-y2}Mn_{x2}M'_{y2}PO_4 \quad \text{formula (II)}$$

in formula (I), $-0.1 \leq x1 \leq 0.2$, $0.3 \leq a1 < 0.97$, $0 < b1 \leq 0.3$, $0 < a1+b1+c1 < 1$, $0 \leq y1 < 0.2$, M1 is at least one selected from Mn and Al, M2 is one or more selected from Fe, Cr, Ti, Zn, V, Al, W, Mg, B, Cu, Y, Si, Sr, Zr and Ce, and A1 is one or more selected from S, N, F, Cl, Br, PO43- and I; and
in formula (II), $0 \leq x2 \leq 1$, $0 \leq y2 \leq 0.1$, and M' is one or more selected from transition metal elements and non-transition metal elements other than Fe and Mn; and
connecting the first type of battery cells and the second type of battery cells at least in series to form the battery module according to claim 1.

14. A device for manufacturing a battery module, characterized in comprising:
a clamping arm unit, which is used to obtain a first type of battery cells and a second type of battery cells,
the first type of battery cells and the second type of battery cells are battery cells of different chemical systems, the first type of battery cells comprises N first battery cells, the second type of battery cells comprises M second battery cells, N and M are positive integers, the positive electrode plate of the second battery cell contains two or more than two positive electrode active materials, and when a dynamic SOC of the second battery cell is in a range from 90% to 98%, a change rate $\Delta OCV/\Delta SOC$ in an OCV relative to the SOC of the second battery cell satisfies $3 \leq \Delta OCV/\Delta SOC \leq 9$, where SOC represents a charge state and OCV represents an open circuit voltage, and when a dynamic SOC of the battery module is in the range from 90% to 98%, a ratio Q of $\Delta OCV/\Delta SOC$ of the second battery cell to $\Delta OCV/\Delta SOC$ of the first battery cell is $2 \leq Q \leq 40$, wherein the positive electrode active material of the first battery cell comprises a lithium-containing phosphate represented by formula (III), $$LiFe_{1-x3-y3}Mn_{x3}M''_{y3}PO_4 \qquad \text{formula (III)}$$

in formula (III), $0 \leq x3 \leq 1$, $0 \leq y3 \leq 0.1$, and M" is one or more selected from transition metal elements and non-transition metal elements other than Fe and Mn, or the positive electrode active material of the first battery cell comprises a layered lithium transition metal oxide represented by formula (IIII), $$Li_{1+x4}Ni_{a2}Co_{b2}M3_{c2}M4_{1-a2-b2-c2}O_2-y4A2_{y4} \qquad \text{formula (IIII)}$$

in formula (IIII), $-0.1 \leq x4 \leq 0.2$, $0.3 \leq a2 < 0.95$, $0 < b2 < 0.3$, $0 < a2+b2+c2 < 1$, $0 \leq y4 < 0.2$, M3 is at least one selected from Mn and Al, M4 is one or more selected from Fe, Cr, Ti, Zn, V, Al, Zr and Ce, and A2 is one or more selected from S, F, Cl and I, and wherein the positive electrode active material of the second battery cell comprises at least a layered lithium transition metal oxide represented by formula (I) and a lithium-containing phosphate represented by formula (II), $$Li_{1+x1}Ni_{a1}Co_{b1}M1_{c1}M2_{1-a1-b1-c1}O_2-y1A1_{y1} \qquad \text{formula (I)}$$

$$LiFe_{1-x2-y2}Mn_{x2}M'_{y2}PO_4 \qquad \text{formula (II)}$$

in formula (I), $-0.1 \leq x1 \leq 0.2$, $0.3 \leq a1 < 0.97$, $0 < b1 \leq 0.3$, $0 < a1+b1+c1 < 1$, $0 \leq y1 < 0.2$, M1 is at least one selected from Mn and Al, M2 is one or more selected from Fe, Cr, Ti, Zn, V, Al, W, Mg, B, Cu, Y, Si, Sr, Zr and Ce, and A1 is one or more selected from S, N, F, Cl, Br, PO4 3- and I; and in formula (II), $0 \leq x2 \leq 1$, $0 \leq y2 \leq 0.1$, and M' is one or more selected from transition metal elements and non-transition metal elements other than Fe and Mn;

an assembling unit, which is used to connect the first type of battery cells and the second type of battery cells at least in series to form the battery module according claim 1; and a control unit, which is used to control the clamping arm unit and the assembling unit.

15. The battery module according to claim 1, wherein $4 \leq Q \leq 32$.

* * * * *